(No Model.)
F. F. IDE.
OIL TRAP FOR STEAM ENGINES.
No. 365,259. Patented June 21, 1887.
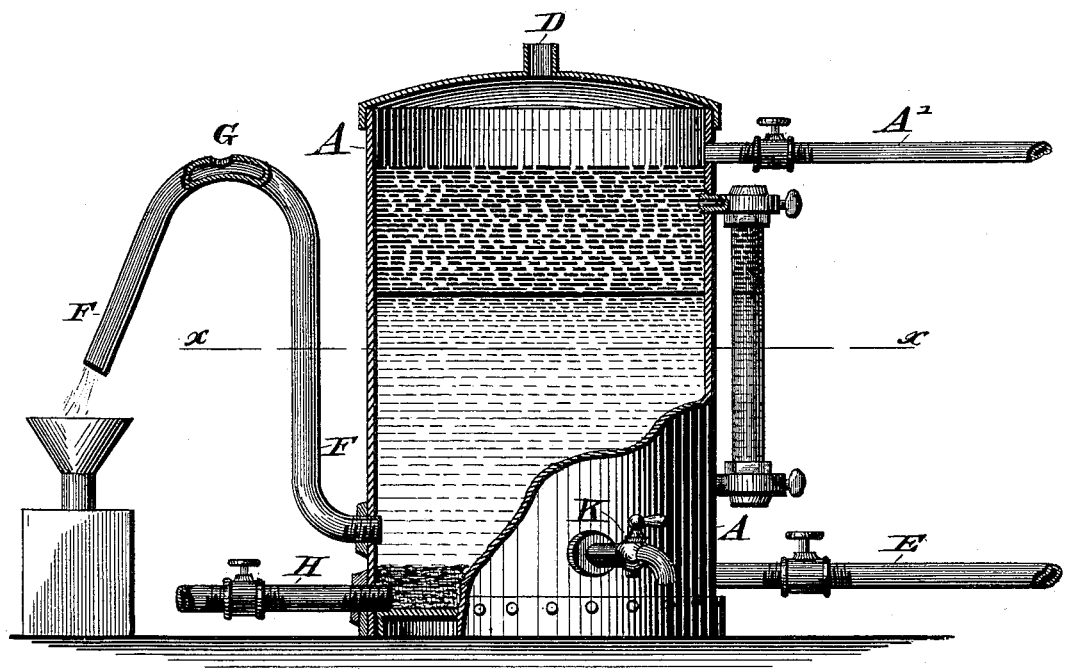
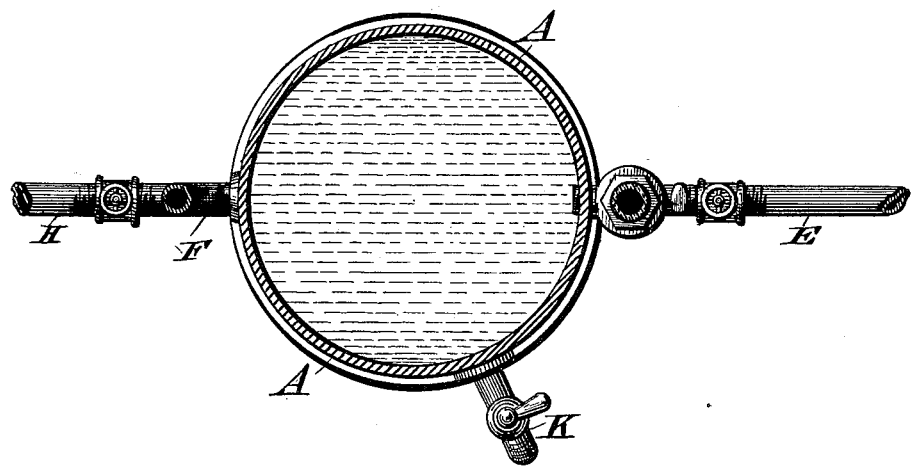
WITNESSES
INVENTOR

United States Patent Office.

FERDINAND F. IDE, OF SPRINGFIELD, ILLINOIS.

OIL-TRAP FOR STEAM-ENGINES.

SPECIFICATION forming part of Letters Patent No. 365,259, dated June 21, 1887.

Application filed September 21, 1885. Renewed March 17, 1887. Serial No. 231,346. (No model.)

*To all whom it may concern:*

Be it known that I, FERDINAND F. IDE, a citizen of the United States, resident at Springfield, in the county of Sangamon and State of Illinois, have invented certain new and useful Improvements in Oil-Traps for Steam-Engines; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of a side elevation, partly in vertical section. Fig. 2 is a horizontal section taken on line $x\ x$, Fig. 1.

This invention consists in the construction and novel arrangement of devices forming an oil and water trap, whereby the waste oil from the engine is caught and presumed to be used again, all as hereinafter set forth, and pointed out in the appended claims.

Referring to the accompanying drawings, the letter A designates a vessel or trap of sufficient size to hold oil and water and connected to the drip or waste pipe from the engine indicated at A'. A live-steam pipe, E, from the boiler is also usually connected to the vessel, said pipe being provided with a stop-cock. The pipe A' is also provided with a stop-cock. At one side of the trap-vessel is usually provided a glass tube extending vertically, and forming a sight whereby the amount of oil in the trap can be observed. The top of the trap-vessel is open or provided with an opening, D.

F is a waste-water pipe or passage, which at one end opens near the bottom of the vessel A, and thence extends upward to the height at which the contents of this vessel are to stand, and thence to the point of discharge of the waste water. In this pipe F an opening, G, is provided to prevent siphon action, which would discharge the oil as well as the water from the trap. Usually a blow-off pipe, H, is provided at the bottom of the vessel A to enable the settlings to be blown out by the operation of the steam from the live-steam pipe when necessary.

The action of the trap is as follows: The oil-laden drip from the engine passes into the vessel A, and here the water of condensation settles to the bottom, and the oil rising is preserved in the vessel. The water escapes through the waste-pipe F. Undue pressure is prevented by the opening at the top of the vessel A and siphon action by the opening in pipe F. When sufficient oil is caught in the trap, it can be drawn off by the faucet K. This oil will be found to be purified, and in quantity will be about two-thirds of that fed to the engine. It can be used again with even better results on account of its purification.

I am aware of the patent granted to Butler, June 30, 1885, No. 321,340, for an improvement in milk-coolers, and also the patent granted to Hofstatter, May 23, 1876, No. 177,640, for an improvement in creaming-cans, and therefore do not claim such devices.

Having described this invention, what I claim, and desire to secure by Letters Patent, is—

1. An oil-trap provided with a relief-opening at its top and having a waste-pipe provided with an opening to prevent siphon action, and having its mouth near the bottom of the trap-vessel, whereby the water of condensation is allowed to pass off and the oil is held in the vessel, the whole adapted to serve with a steam-engine substantially as specified.

2. The combination, in an oil-trap, of the trap-vessel A, having the opening D in its top, the drip or waste pipe A', connected with the upper portion of the said vessel and leading to the waste-pipe of an engine, and the pipe F, connected with the vessel A above its bottom, bent upwardly and provided with an opening, G, and having a downwardly-directed discharge end, the whole adapted to serve with a steam-engine substantially as specified.

3. An oil-trap having a siphon waste-pipe provided with a vent, an oil-discharge cock, and a sight to show heights of oil with relation to said discharge-cock, the whole adapted to serve with a steam-engine substantially as specified.

4. An oil-trap having a relief-opening in its top, a waste-pipe to draw off the water of condensation, a pipe for connecting the trap with an engine, an oil-discharge, and a sight in connection with said oil-discharge to show the height of the oil, substantially as specified.

5. The oil-trap for steam-engines, consisting of the trap-vessel, the drip-pipe, and the live-steam pipe connected thereto, the relief-opening in the top of the blow-off pipe, and the waste-water pipe having an opening to prevent siphon action, substantially as specified.

In testimony whereof I affix my signature in presence of two witnesses.

FERDINAND F. IDE.

Witnesses:
G. BURKHARDT,
H. S. NEWMAN.